(12) United States Patent
Fujioka

(10) Patent No.: US 7,375,625 B2
(45) Date of Patent: May 20, 2008

(54) DETECTOR FOR SUNKEN CONDITION OF VEHICLE

(75) Inventor: Ryoji Fujioka, Kasugai (JP)

(73) Assignee: OMRON Corporation, Kyoto (JP)

( * ) Notice: Subject to any disclaimer, the term of this patent is extended or adjusted under 35 U.S.C. 154(b) by 222 days.

(21) Appl. No.: 10/982,262

(22) Filed: Nov. 5, 2004

(65) Prior Publication Data

US 2005/0099276 A1    May 12, 2005

(30) Foreign Application Priority Data

Nov. 11, 2003    (JP)    ............... 2003-381369

(51) Int. Cl.
*B60C 23/00*    (2006.01)
(52) U.S. Cl. ..................... 340/445; 340/447
(58) Field of Classification Search ............... 340/445, 340/442, 443, 447; 180/271; 116/34 R; 73/146.5
See application file for complete search history.

(56) References Cited

U.S. PATENT DOCUMENTS

| | | | |
|---|---|---|---|
| 3,720,207 A * | 3/1973 | Matheny et al. ....... | 128/202.14 |
| 3,971,425 A * | 7/1976 | Tsuruta ................ | 152/418 |
| 5,938,868 A * | 8/1999 | Miura et al. .......... | 152/331.1 |
| 6,400,263 B1 * | 6/2002 | Kokubo ............... | 340/447 |
| 6,546,791 B2 * | 4/2003 | Yurjevich ............. | 73/146 |
| 6,829,925 B2 * | 12/2004 | Nespo et al. .......... | 73/146 |
| 6,873,891 B2 * | 3/2005 | Moser et al. .......... | 701/48 |
| 6,922,142 B2 * | 7/2005 | Norimatsu ............ | 340/447 |
| 6,959,970 B2 * | 11/2005 | Tseng ................. | 303/146 |

FOREIGN PATENT DOCUMENTS

| | | |
|---|---|---|
| JP | 07-156729 | 6/1995 |
| JP | 10-221090 | 8/1998 |
| JP | 11-287068 | 10/1999 |

* cited by examiner

*Primary Examiner*—John Tweel, Jr.
(74) *Attorney, Agent, or Firm*—Weaver Austin Villeneuve & Sampson LLP

(57) ABSTRACT

A sunken condition of a vehicle provided with a sensor for measuring air pressure inside a tire, a communication device that carries out wireless communications between a vehicle main body and a tire, a steering torque sensor that measures steering torque, a sensor for measuring rotary speeds of driver and follower wheels of the vehicle or a navigating apparatus including a global positioning system and a dead-reckoning device is detected by a detector having a controller without requiring a sensor for detecting the sunken condition. The controller identifies a sunken condition on the basis of a momentary change in detected data, the status of communication from the sensor, a drop in the measured steering torque, a relative drop of the rotary speed of a follower wheel with respect to that of a driver wheel or a disagreement in measured position data by the navigating apparatus.

10 Claims, 5 Drawing Sheets

DETECTOR FOR SUNKEN CONDITION OF VEHICLE

Priority is claimed on Japanese Patent Application 2003-381369 filed Nov. 11, 2003.

BACKGROUND OF THE INVENTION

This invention is in the technical field of detecting the sunken condition of a vehicle in order to improve the safety of the power window function of a vehicle (such as an automobile) and in particular the function of opening the window such that the occupant can escape from a vehicle sunk in water.

Recently, power window systems are coming to be provided with a control circuit for detecting the sunken condition of a vehicle in order to facilitate the escape of occupants dependably from such a vehicle under such a condition. Japanese Patent Publication Tokkai 11-36700, for example, disclosed a technology of preventing a vehicular window from acting on its own will at the time of sinking in water by providing a detection sensor for a sunken condition inside the control box of a power window system such that the relays for driving motors for the windows in both directions will be switched on simultaneously and both terminals of the motor coils will be connected to a power line.

Japanese Patent Publication Tokkai 11-41961 disclosed a device for making vehicular windows dependably operable (at least in the direction of opening them) at the time of sinking into water by providing switching elements (transistors) or switch junctions on both sides of relay coils such that both sides of one of the relay coils corresponding to the operated side are switched on in synchronism when the switch is operated and hence only the specified relay coil will be dependably driven. Since this device does not have the function of detecting whether the vehicle is in a sunken condition or not, it cannot function so as to enable only operations in a specified direction (such as the direction of opening the window) while disabling other operations at the time of a sunken condition or to leave a record of the sunken condition. It is possible, however, to separately provide a device according to aforementioned Japanese Patent Publication Tokkai 11-36700, for example, to detect a sunken condition and to thereupon carry out a suitable corresponding procedure.

Japanese Patent Publications Tokkai 2000-204843, 10-292731 and 11-22301 disclosed the technology of providing a sensor for detecting a sunken condition by detecting water (such as an electrode pair and a float switch for detecting a sunken condition) apart from a control box of a power window system such that the window motor can be driven in the direction of opening the window at the time of a sunken condition for automatically opening the window.

Japanese Patent Publication Tokkai 2000-25542 disclosed the technology of providing not only a water sensor (a first detector) for detecting the contact of water with the vehicular body apart from the control box of the power window system but also a second detector for detecting the contact condition of a tire with the road surface such that a sunken condition will be detected if the first detector indicates the contact of water with the vehicular body and the second detector indicates that the tire is not contacting the road surface and the window is thereupon operated and opened. Regarding this technology, second detectors for detecting suspension stroke, air pressure in the tire, a value related to elongation or contraction of a suspension shock absorber, the oscillation angle of a suspension link or the load on the suspension coil are disclosed.

The technology disclosed in aforementioned Japanese Patent Publication Tokkai 11-36700 is not satisfactory because detection does not take place until the invasion of water into the vehicle makes a certain level of progress after the vehicle falls into water (such as a river, the sea, or flood water) such that the water level reaches the control box. This means that a sunken condition is not always detected sufficiently quickly. Although it may be hoped that power windows can function normally unless the control box is completely immersed in water, there is a high possibility that there may be a leakage elsewhere such that the actuators for the power windows cannot function normally while the control box is still capable of functioning correctly. In short, a sunken condition should be detected as quickly as possible.

By a technology of providing a water-detecting sensor apart from the control box such as disclosed in Japanese Patent Publications Tokkai 2000-204843, 10-292731 and 11-22301, a sunken condition can be detected before the water level reaches the position of the control box if the sensor is appropriately positioned such as the bottom of the vehicular body. To set a sensor apart from the control box, however, complicates the construction and tends to increase the weight of the vehicle. There is also the disadvantage that an extra space for the setting is required and there is the problem of reaching a mistaken conclusion if water is splashed thereupon while the vehicle is running in rain.

Neither is the technology disclosed in Japanese Patent Publication Tokkai 2000-25542 free of problems. Since a sunken condition is not detected unless the tire is found to be in a non-contacting condition with the road surface, the sunken condition may not be detected sufficiently quickly. When the vehicle has fallen into a river where the water is not sufficiently deep or when the level of flood water is only gradually rising from the road surface, for example, a sunken condition should be reported but will not be reported because the tire is not in a non-contacting condition with the road surface. Since a sensor must be set apart from the control box, furthermore, there is the same disadvantage as with the aforementioned technology according to Japanese Patent Publications Tokkai 2000-204843, 10-292731 and 11-22301.

SUMMARY OF THE INVENTION

It is therefore an object of this invention to provide a detector for a sunken condition of a vehicle capable of detecting the sunken condition quickly and reliably without requiring a sensor for detecting a sunken condition.

A detector according to a first embodiment of this invention for a sunken condition of a vehicle may be characterized as comprising a sensor for measuring air pressure inside a tire and a controller that monitors data on tire pressure obtained by the sensor and identifies a sunken condition of the vehicle when a specified rate of change in these data is momentarily observed. In the above, the sunken condition means a condition wherein the vehicle has come to a position where the height of the water surface above the road surface is such that the tire is not contacting the road surface with a sufficient pressure (or the bottom of the water). In other words, situations wherein the water is sufficiently shallow with respect to the height of the vehicle are excluded because if the water is sufficiently shallow and the tires are contacting the road surface with a sufficient pressure, the vehicle is capable of running substantially normally and the condition need not be considered to be abnormal.

In the above, the specified rate of change may be a preliminarily set range or a range that may be appropriately adjusted according to various parameters such as the absolute value of the tire air pressure and the running speed of the vehicle. A change being momentarily observed means that a change in the tire air pressure at a specified rate is observed for a specified number of times or over a specified length of time. The air tire pressure may mean the air pressure in one of the plurality of tires or the pressure in all of the tires. In other words, the controller may be set to identify a sunken condition when a certain rate of change in the air pressure is observed for one of the tires or when it is observed regarding all of the tires. In the case of a four-wheeled vehicle, the identification of a sunken condition may be based on observation on any two of the wheels such as mutually adjacent wheels (both front wheels, both rear wheel, both wheels on the left-hand side or both wheels on the right-hand side) or two wheels that are mutually diagonally located. Such modes of identification are advantageous because an erroneous identification of a sunken condition can be avoided when the air pressure in only one of the wheels drops when the vehicle is jacked up, say, for inspection. Identifications by two mutually adjacent wheels are advantageous also because a sunken condition can be identified, say, even when only one side of the vehicle has sunk in water.

A prior art circuit such as a control circuit of a controller in a tire pressure monitoring system or a control circuit of a power window system of a known kind may be used as the detector of this invention.

A detector according to a second embodiment of the invention may be characterized as comprising a communication device that carries out wireless communications between a vehicle main body and a tire and a controller that monitors status of these wireless communications and identifies a sunken condition of the vehicle when a status wherein the wireless communications remain impossible continues over a specified length of time or a specified number of times. In the above, the status wherein communication remains impossible may be situations where communications only in one direction such as communications from the tires to the vehicle main body remain impossible or where communications in both directions are impossible such that normal response from the tires cannot be received although transmissions are made from the vehicle main body to the tires.

A detector according to a third embodiment of the invention is for detecting a sunken condition of a vehicle having a steering torque sensor that measures steering torque and may be characterized as also comprising a controller that monitors data on steering torque measured by this steer torque sensor and identifies a sunken condition of the vehicle based on a drop in the measured steering torque.

A detector according to a fourth embodiment of the invention is for detecting a sunken condition of a vehicle equipped with a sensor (or sensors) for measuring rotary speeds of driver and follower wheels of the vehicle and may be characterized as comprising a controller that monitors data outputted from the sensor (or sensors) and identifies a sunken condition of the vehicle based on a relative drop of rotary speed of a follower wheel (with respect to that of a driver wheel).

A detector according to a fifth embodiment of the invention is for detecting a sunken condition for a vehicle equipped with a navigation apparatus provided with both a global positioning system and a dead-reckoning device for sensing rotations of wheels of the vehicle and calculating motion and rotary angle of the vehicle based on the sensed rotations of its wheels, and may be characterized as comprising a controller that monitors position data of the vehicle obtained by the global positioning system and by the dead-reckoning device and identifies a sunken condition based on disagreement between their position data.

A sunken condition transmitting device for transmitting a signal indicative of the identified sunken condition may be further provided to any of these detectors.

DETAILED DESCRIPTION OF THE INVENTION

Embodiments of this invention are described next with reference to the drawings.

Figure 1:
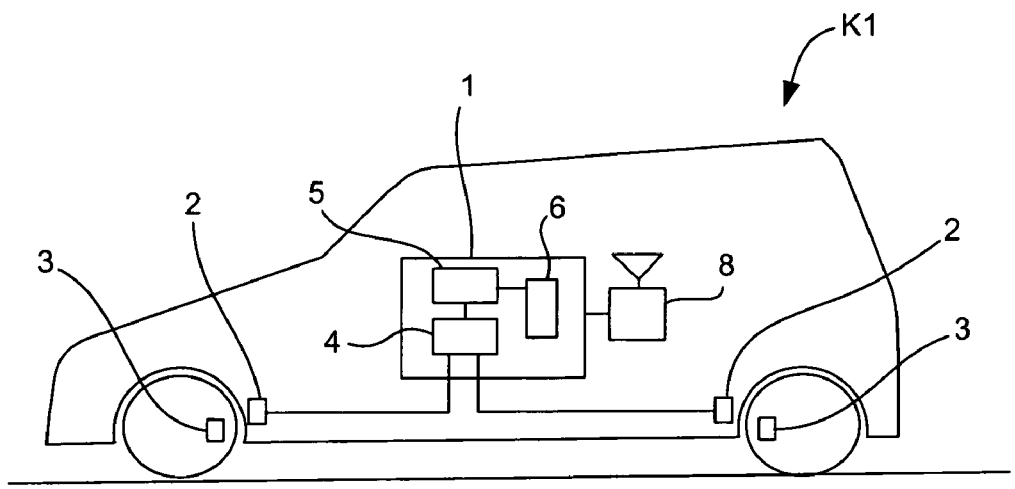
FIG. 1 is a schematic drawing of a vehicle with a detector according to a first embodiment of the invention.

FIG. 1 shows a four-wheel vehicle K1 provided with a tire pressure monitoring system (TPMS) and a detector according to a first embodiment of this invention. The elements that comprise the TPMS include a controller 1, antennas 2 and sensor units 3. The controller 1 is that of the TPMS set inside a control box carried by the vehicle and is provided with a microcomputer and a communication circuit (at least for reception), serving to receive through the antennas 2 wireless signals transmitted periodically from the sensor units 3, to read air pressure data contained in the wireless signals and to output an alarm (by sound, light and/or a character display) to inform the user if, for example, the air pressure value of a tire has dropped below an allowable level. The antennas 2 are each set near a corresponding one of the tires such as inside the tire housing and serve to receive wireless signals from the corresponding one of the sensor units 3, and to input them to the controller 1.

The sensor units 3 are each set inside a corresponding one of the tires and provided with an air pressure sensor for measuring the pressure inside the tire, a communication circuit (at least a transmission circuit) for transmitting the measured air pressure data as a wireless signal and an antenna.

Use may be made of a TPMS of a two-way communication type also adapted to transmit wireless signals from the antennas 2 on the vehicle body to the sensor units 3 inside the tires. Such a two-way TPMS may be used, for example, such that the controller 1 transmits a request signal to the sensor units 3 periodically or at a specified timing such as when the engine is started and the sensor units 3 respond to this request signal by returning answer signals containing the most recent air pressure data.

The controller 1 includes a reception circuit 4, an air pressure monitoring device 5 and a judging device 6, as schematically illustrated in FIG. 1. The reception circuit 4 serves to demodulate the signals received through the antennas 2, and the air pressure monitoring device is for obtaining air pressure values from the signals demodulated by the reception circuit 4. The judging device 6 serves to judge whether or not the vehicle K1 is in a sunken condition. In addition to the controller 1, the vehicle K1 may also be provided with a signal transmitter 8 (or a "sunken condition transmitting device") for transmitting a wireless signal indicative of the presence of a sunken condition judged to be present by the judging device 6.

Figure 2:
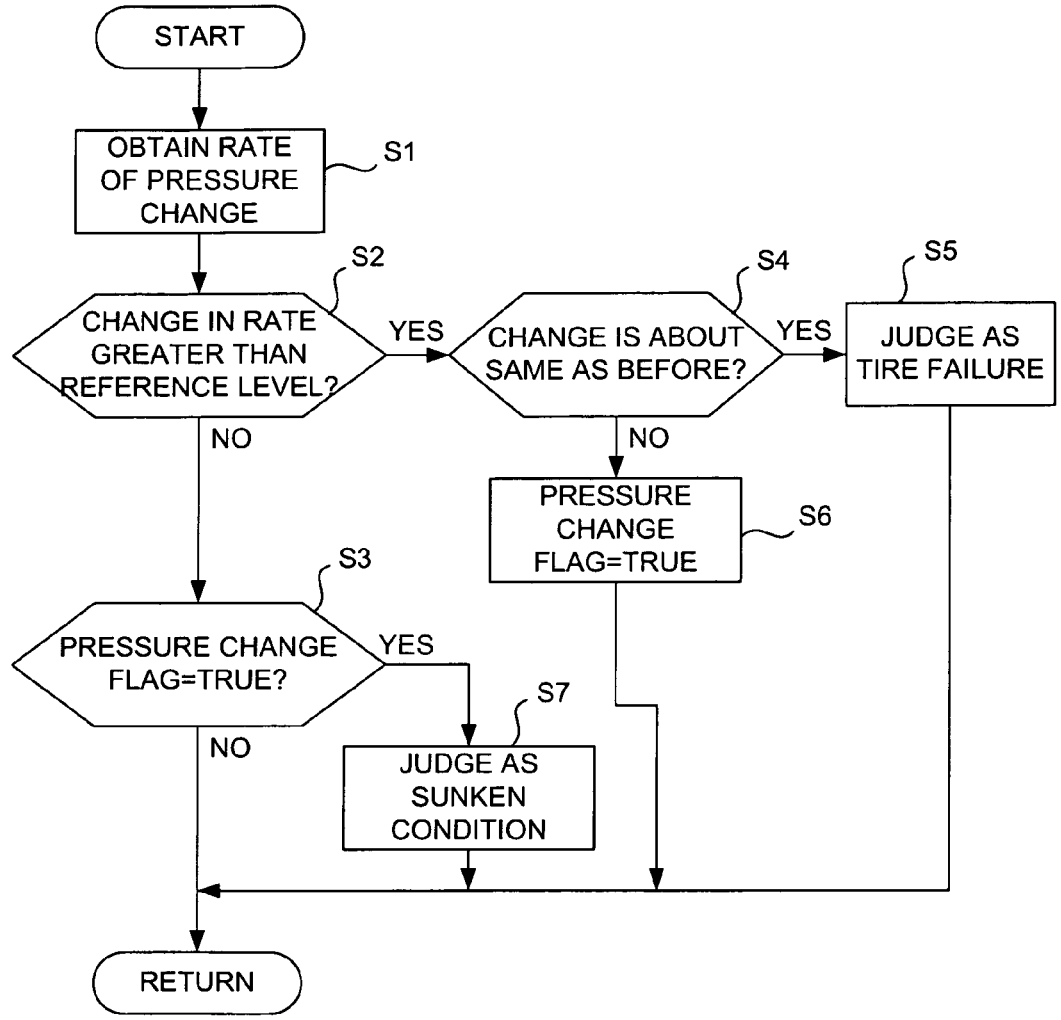
FIG. 2 is a flowchart of processes carried out by a detector according to the first embodiment of the invention.

FIG. 2 is a flowchart of a routine which may be carried out by the controller 1. This routine may be carried out periodically by the controller 1, starting by calculating the differences between the newest tire pressure data received from the sensor units 3 and older tire pressure data received earlier and the rate of pressure change per unit time for each tire based on the calculated differences (Step S1). Next, it is determined whether or not the rates of pressure change thus calculated are equal to or greater than a preliminarily specified reference rate of change (Step S2).

When the vehicle is jacked up for changing a tire or for the purpose of an inspection, the tire pressure drops, and when a tire is passing over a step, the tire pressure increases momentarily. In order to avoid being misled in such a situation into concluding that it was because the vehicle is in a sunken condition, it is preferable to carry out Step S2 under the condition that the ratio of pressure change is equal to or greater than the reference level for all tires (or two mutually neighboring tires) and that the pressure change is in the direction of becoming smaller.

If the current rate of pressure change is smaller than the reference level (NO in Step S2), it is determined whether or not the pressure change flag (to be explained below) indicates "true" (Step S3). If it does not indicate "true" (NO in Step S3), this sequence of the routine is completed and returned to the start.

If the current rate of pressure change is not less than the reference level (Yes in Step S2), it is determined whether or not the difference in the rate of pressure change this time in Step S2 and when the judgment in Step S2 was YES in the previous (or earlier) sequence is within a specified range of error (Step S4). In other words, it is determined whether or not the rate of pressure change this time was about the same as before. If the judgment in Step S4 is YES, the routine proceeds to Step S5. If it is NO, the routine proceeds to Step S6.

In order to even more reliably avoid errors in making this judgment above due, for example, to the tire going over a step to cause a momentary variation in the tire pressure, the routine may be carried out by skipping Steps S5 and S6 and retuning to the beginning independent of the judgment result of Step S4 if the judgment in Step S2 for the same tire in the earlier sequence by a specified number of times is not YES (or if the specified pressure change has not been observed on the same tire for a specified number of times).

In Step S5, it is concluded that an abnormal condition such as a tire failure has occurred and an alarm is outputted to inform the driver that there is a tire trouble by way of a sound, light or a character display. In Step S6, the value of the pressure change flag is set to "true." If the judgment in Step S2 in the previous sequence was not YES, however, the pressure change flag is left at its initial value and not set to "true."

In Step S7, it is concluded that a sunken condition has occurred and a sunken condition signal is outputted (say, through the aforementioned signal transmitter 8) to another control circuit such as the control circuit of the power window system, thereby placing a command that a control of a process be executed. Such a control may be executed by the controller 1 (the controller of the TPMS) itself.

Examples of the measure to be taken by a TPMS in the case of a sunken condition include, as explained in the Background section, automatically opening all windows and setting the control circuit in a particular condition such that the window-opening operation can at least remain possible even under an immersed condition. Processes such as sounding an alarm and preparing a record (such as diagram data) may also be executed.

According to the routine of FIG. 2, the processes of one sequence are completed after Steps S5-S7 and the system returns to the initial condition. The pressure change flag may be returned to its initial value after Step S7. The condition of executing the aforementioned measure after judging that a sunken condition has occurred (the sunken condition mode) may be released after a preliminarily specified length of time has elapsed.

As explained above, if a change in the tire pressure greater than a preliminarily set rate of change is observed once (in the direction of becoming smaller), the pressure change flag is set to "true" in Steps S4 and S6 and then the processes proceed from Step S3 to Step S7 to make the judgment that a sunken condition has occurred. If the change in the tire pressure continues, however, the process proceeds from Step S4 to Step S5 and it is judged to be a tire failure, distinguishing between a tire failure and a sunken condition.

Figure 3:
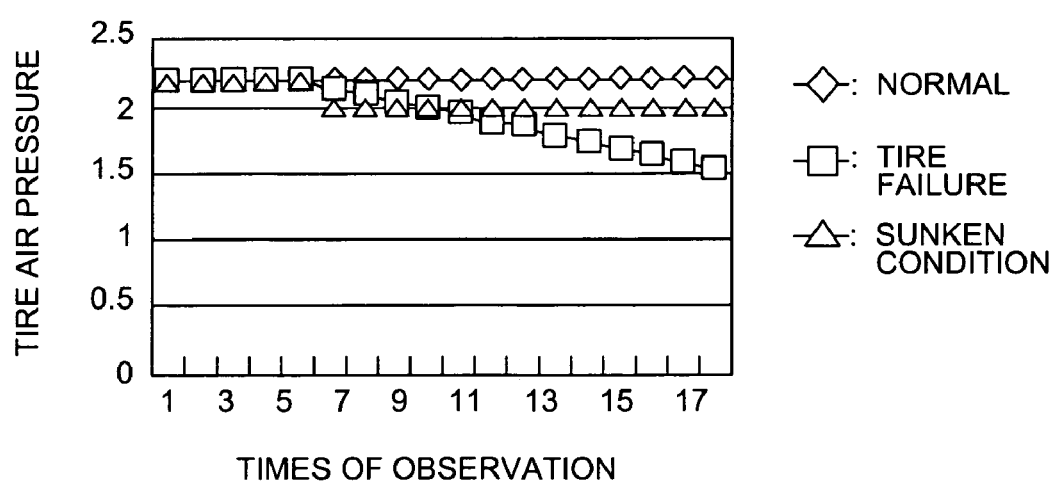
FIG. 3 is a graph showing an example of change in tire pressure under different circumstances.

In summary, a sunken condition of a vehicle is quickly and dependably detected according to this embodiment of the invention without requiring a sensor for the detection of a sunken condition but merely by using tire pressure sensors with which the vehicle K1 may already be provided. This is because the weight of the vehicle on the tires become reduced due to the buoyant force by water if the vehicle sinks in water and the tire pressure becomes temporarily reduced, as shown in FIG. 3. A rate of change which may be used as a reference for judgment in aforementioned Step S2 may preliminarily be set to an appropriate experimentally determined value such that a sunken condition can be detected dependably.

In the case of a tire failure such as a puncture, the tire pressure continues to become smaller as shown (by squares) in FIG. 3. In the case of a pressure drop due to a sunken condition, by contrast, the tire pressure drops rapidly first and then remains the same thereafter (as shown by triangles). If the vehicle gradually sinks in water, the tire pressure, which initially drops, may even increase again gradually due to the external hydrostatic pressure. With a detector according to this invention which detects a sunken condition by the pressure change with time, it is possible to distinguish between a sunken condition and a tire failure. Since the detector according to this invention does not depend on the contact condition of the tires with the road surface, furthermore, a sunken condition can be detected although the tire may not be separated from the road surface as long as the tire pressure changes by a greater rate than a specified rate. Thus, a sunken condition can be detected quickly and reliably.

A detector of a sunken condition according to a second embodiment may be described also by FIG. 1 except that the controller 1 and the sensor units 3 are adapted to carry out two-way telecommunications. In other words, the controller 1 according to this embodiment of the invention is adapted to carry out not only the basic controls as a TPMS but also processes according to the flowchart shown in FIG. 4 to identify a sunken condition of the vehicle.

Figure 4:
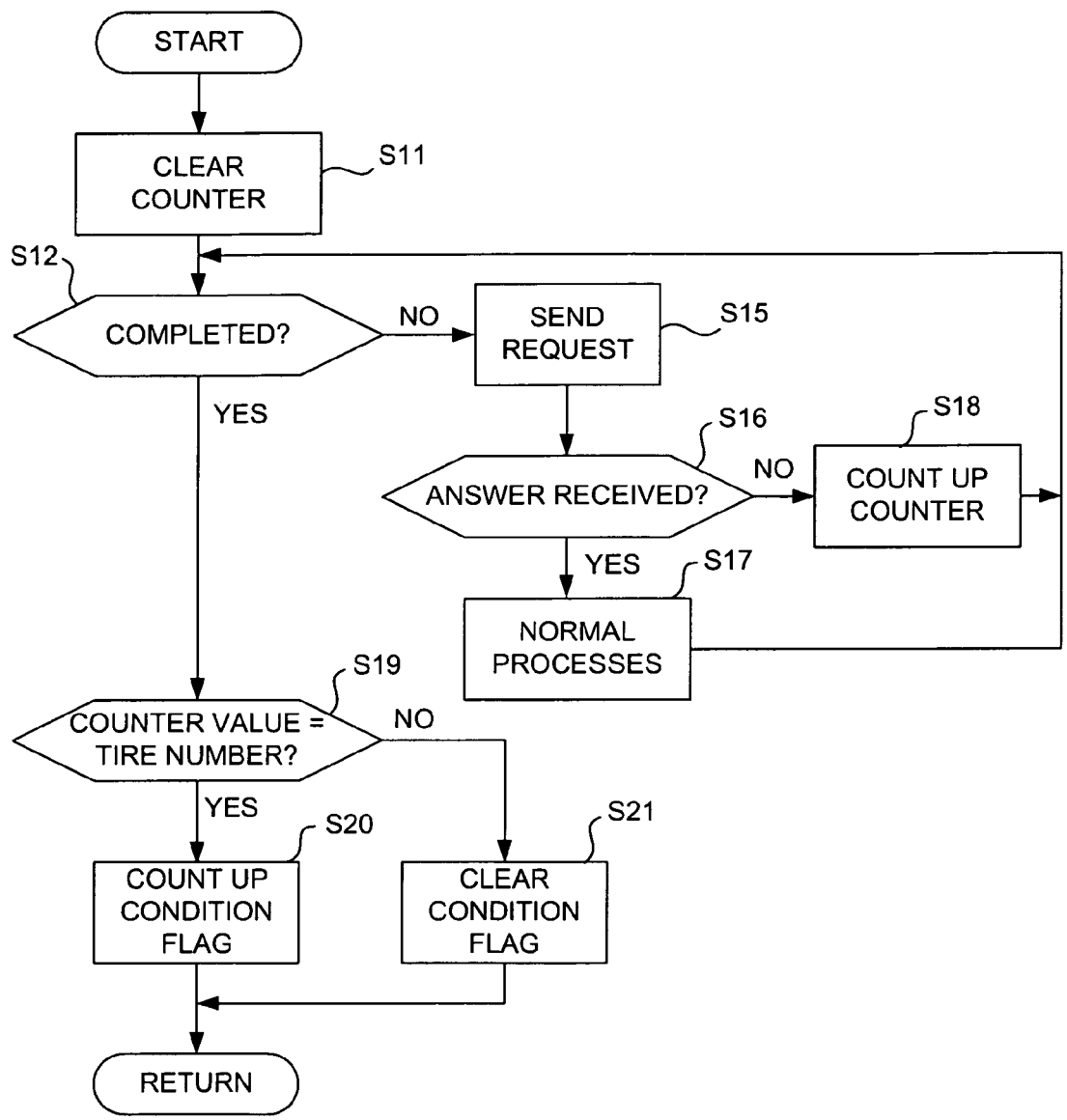
FIG. 4 is a flowchart of processes carried out by a detector according to the second embodiment of the invention.

To explain more in detail, the controller 1 according to this embodiment of the invention carries out, for example, the processes of the flowchart of FIG. 4 periodically, by initially setting the value of a communication error counter to zero (Step S11) and next checking whether or not the processes of Steps S15-S18 have been completed (Step S12). If the judgment in Step S12 is YES, the controller 1 proceeds to Step S19. If the judgment in Step S12 is NO, the controller proceeds to Step S15.

In Step S15, the controller sends a request signal to the sensor units 3, requesting the tire pressure to be measured and an answer to be returned. Next, it is determined whether or not an answer has been returned from the sensor units (Step S16). If it is determined that answer signals have been returned (YES in Step S16), normal processes are carried out (Step S17), that is, the basic control processes of a TPMS are carried out such as reading out tire pressure data contained in the answer signals that have been received and outputting an alarm if the received data indicate a pressure value equal to or less than an allowable threshold value. If it is determined that the answer signals have not been received (NO in Step S116), the value of a communication error counter is incremented (or "counted up") (Step S18).

Next, it is checked whether or not the value of the communication error counter has matched the tire number (=4 in the present example of a four-wheeled vehicle) (Step S19). If the communication error counter value has matched the tire number (YES in Step S19), the value of the sunken condition flag is counted up (Step S20), the processes of one sequence are completed and the controller 1 returns to the beginning of another sequence. If the communication error counter value has not matched the tire number (NO in Step S19), the value of the sunken condition flag is reset to zero (Step S21) and the controller 1 returns to the beginning of the next sequence. Although not shown in the flowchart, the controller 1 reads out the value of the sunken condition flag after Steps S20 and S21 and carries out processes for judging that the vehicle is in a sunken condition if the value of the flag is equal to or over a set value.

In summary, a wireless communication is attempted by the TPMS with each of the tires and normal processes are carried out on each of the tires from which a normal response has been received. For each of the tires from which a normal answer could not be obtained, the value of the communication error counter is incremented (Steps S12 and S15-S18). If the value of the communication error counter is the same as the number of the tires, this means that every tire had a communication error and Step S20 is carried out after Step S19, the value of the sunken condition flag being incremented. If this condition of communication failure with all of the tires continues for a specified number of times, the value of the sunken condition flag reaches a specified number and it is concluded that a sunken condition has occurred.

Thus, a sunken condition can be quickly and reliably detected by using an existing wireless communication means and without requiring a sensor for detecting a sunken condition. This is because the antennas of the TPMS (or at least the antennas of the sensor units 3 on the tires) become immersed in water as the vehicle sinks and the electromagnetic waves carrying signals are quickly attenuated such that wire communications between the tires and the vehicular main body become impossible suddenly and this condition is maintained. If the wireless communication becomes impossible for a reason other than a sunken condition such as the relative position between the antennas 2 on the vehicle and the sensor units 3 on the tires or the rotational positions of the tires (or the so-called null point), the wireless communication becomes impossible only momentarily. Thus, a detector according to this embodiment of the invention can detect a sunken condition quickly and reliably because it is adapted to check whether or not the condition of impossible communication continues over a specified number of times, and the detected sunken condition may be communicated to an external system through the sunken condition transmitting device 8 described above with reference to FIG. 1.

Figure 5:
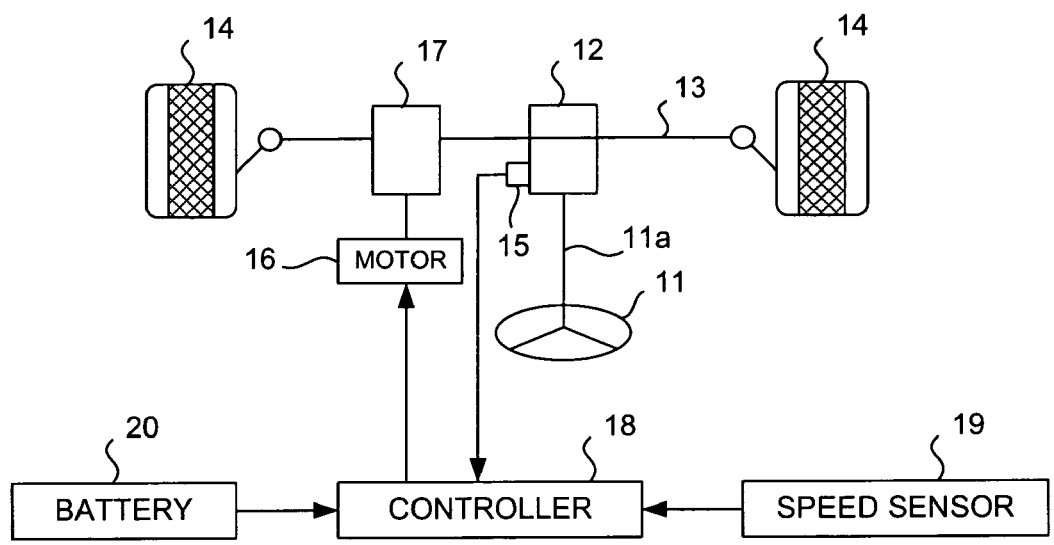
FIG. 5 is a schematic block diagram of an electric power steering system (EPS) incorporating a detector embodying this invention.

A third embodiment of the present invention relates to a detector for a vehicle equipped with an electric power steering system (EPS). As shown in FIG. 5, the EPS includes a steering wheel 11 with a steering shaft 11a, a pinion gear 12 connected to the steering wheel 11 through the steering shaft 11a and a rack shaft 13 corresponding to the pinion gear 12, numerals 14 each indicating a tire. The EPS further includes a torque sensor 15 for detecting the steering torque exerted on the steering wheel 11, a motor 16 for generating a steering force, a driving mechanism 17 for transmitting the steering force to the rack shaft 13 and a controller 18 for controlling the current to the motor 16 (or output of the motor 16) according to the detected steering torque. Speed signals indicative of the traveling speed of the vehicle outputted from a speed sensor 19 and power from a battery 20 are also supplied to the controller 18.

The controller 18 functions not only to carry out the basic processes of an EPS but also as a means for judging a sunken condition of the vehicle. Explained more in detail, the controller 18 functions to monitor the measured data by the torque sensor 15 and judges a sunken condition of the vehicle based on the lowering of the measured steering torque. It may be adapted to detect a sunken condition as the measured steering torque drops to or below a specified threshold value or as the rate of drop in the measured steering torque exceeds a specified threshold value.

In order to avoid erroneous judgments when the steering torque drops due to a road surface with a low coefficient of friction such as a frozen road surface, use may be made of a variable threshold value depending, for example, on the external temperature and/or the traveling speed of the vehicle as measured by the speed sensor 19.

With such a detector according to the third embodiment of the invention, a sunken condition of the vehicle can be detected without a sensor for detecting a sunken condition but by making use of the already existing steering torque sensor. It is because, as a sunken condition occurs, the frictional resistance between the tires and the road surface becomes drastically reduced or zero, significantly affecting the steering torque. Thus, a sunken condition can be detected by monitoring the lowering of the steering torque, and the detected sunken condition may be communicated to an external system through the sunken condition transmitting device 8 described above with reference to FIG. 1.

Figure 6:
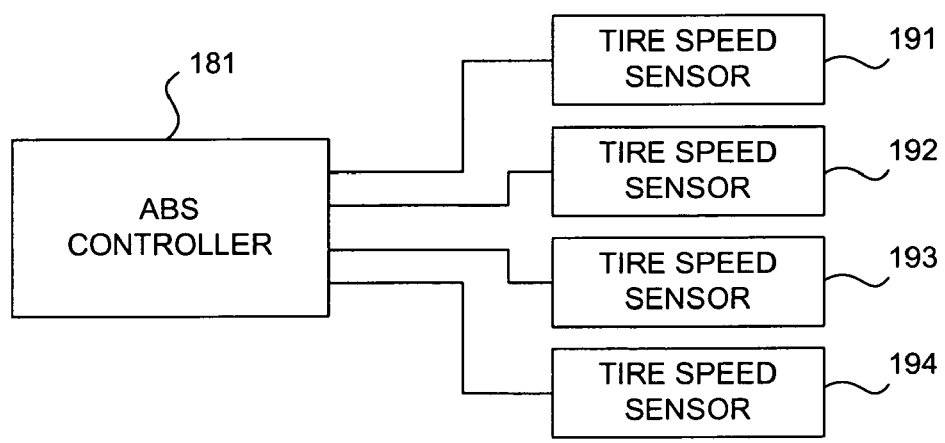
FIG. 6 is a schematic block diagram of a detector according to the fourth embodiment of this invention.

A detector according to a fourth embodiment of the invention is for detecting a sunken condition of a vehicle having an automatic braking system (ABS), adapted to monitor measured data by sensors 191, 192, 193 and 194 for the rotary speed of the tires by means of an ABS controller 181 as shown in FIG. 6 and to detect a sunken condition on the basis of the relative lowering of the rotary speed of a follower wheel (tire).

A sunken condition may be identified, for example, when the rotary speed of one or more of the follower wheels is found to have dropped to or below a specified threshold value while the rotary speed of one or more of the driver wheels is in excess of another specified threshold value. As another example, a sunken condition may be identified when the difference in rotary speed between the driver and follower wheels is beyond a specified value.

In order to prevent erroneous identification of a sunken condition when the rotary speed of a follower wheel drops relative to that of a driver wheel because the brake has been applied, the detector may be designed to take into consideration of the application status of the brake. This may be done, for example, by including the non-application of the brake as a necessary condition for identifying a sunken condition.

Figure 7A:
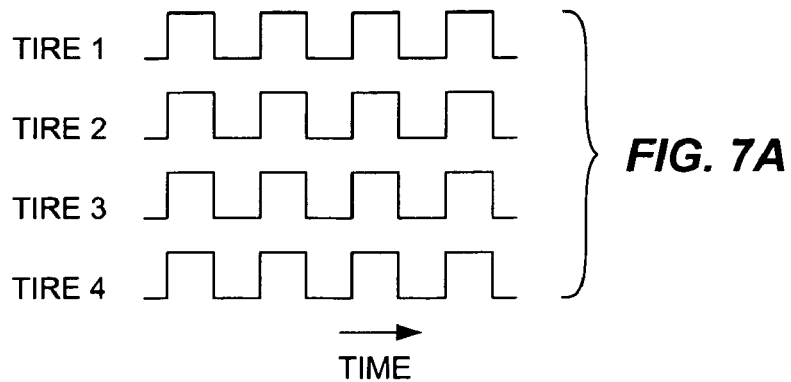
FIGS. 7A and 7B are drawings for showing the tire rotations from which a sunken condition may be detected according to this invention.
Figure 7B:
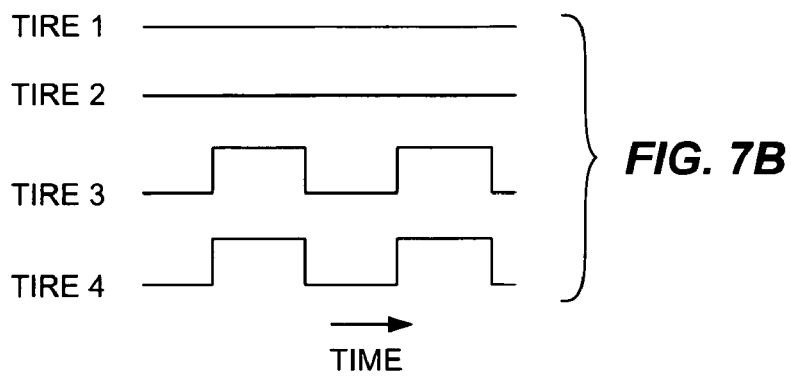

A detector according to the fourth embodiment of this invention can also detect a sunken condition reliably and quickly without using a sensor for a sunken condition because not only does the friction between the tires and the road surface drop drastically or become zero when a sunken condition occurs but also the resistance of water is applied on the tires and hence the rotary speed of the follower wheels drops significantly while the driver wheels continue to rotate as long as the engine is functioning and the transmission is not in the neutral condition. Under a normal condition, the signals indicative of the rotation of the wheels look as shown in FIG. 7A, repeating HIGH and LOW at regular intervals. If the vehicle becomes immersed in water while the engine is running and the transmission is not shifted, the rotation of the follower wheels soon stops and the signals indicative of their rotation soon cease to change while the signals for the driver wheels continue to change, as shown in FIG. 7B. Thus, a sunken condition can be detected from the relative drop of the rotary speed for a follower wheel.

An erroneous judgment may be made with a detector as described above if a wheel comes off. If a driver wheel on one side comes off, however, the driver wheel on the other side should be stationary and in contact with the road surface. Thus, a misjudgment can be obviated if it is made a condition that both driver wheels should be rotating. If both driver wheels have dropped off such as when the two front wheels of a front-wheel-driving type of vehicle have fallen off as the vehicle dropped from a pier, there is no problem by making the windows automatically openable.

A fifth embodiment of the present invention relates to a detector for a vehicle equipped with a global positioning system (GPS) and a dead-reckoning function, adapted to monitor the GPS position data obtaining by a GPS controller and the dead-reckoning function and to identify a sunken condition from a discrepancy between them. A sunken condition may be identified, for example, when the difference (distance) between the absolute positions obtained from each set of data exceeds a specified threshold value, when the traveled distance by the vehicle obtained by the distance data (say, the difference between the position data based on the current sampling and those based on an earlier sampling) exceed a specified threshold value, or when the difference in the shape of the travel path of the vehicle (such as the curvature) and the direction of travel exceeds a specified threshold value.

In order to prevent erroneous identification of a sunken condition when the vehicle is being transported on a ferry or on a truck, the position of the transmission lever or the hand brake may be taken into consideration in the judgment. For example, the detector may be set such that no identification of a sunken condition will be outputted when the control lever is in the neutral or parking position or when the hand brake is in the applied condition. The detected sunken condition, according to the fourth embodiment of the invention, too, may be communicated to an external system through the sunken condition transmitting device 8 described above with reference to FIG. 1.

Figure 8:
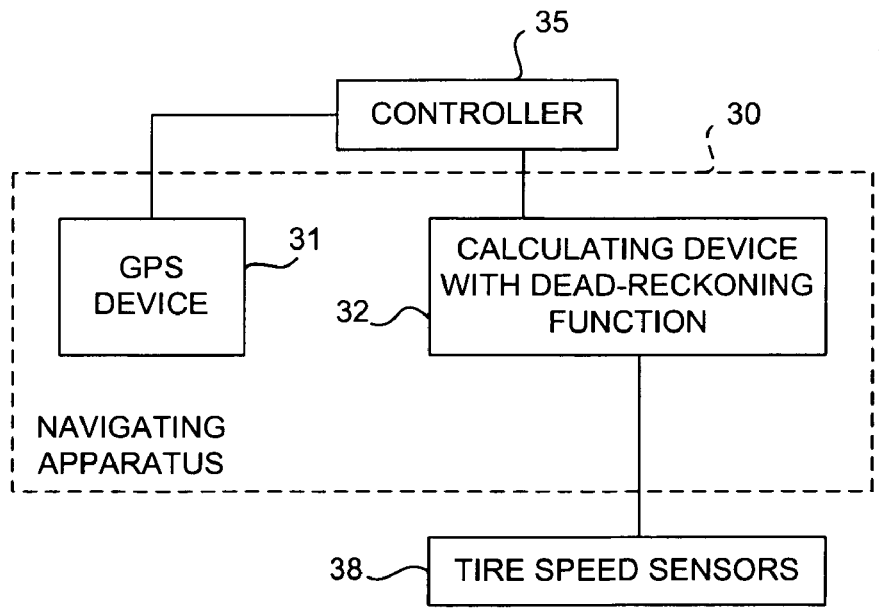
FIG. 8 is a schematic block diagram of a detector according to the fifth embodiment of this invention.

A detector according to the fifth embodiment of this invention can also detect a sunken condition reliably and quickly without using a sensor for a sunken condition but merely by using an already existing navigation apparatus 30 including a GPS device 31 and a calculating device 32 with the so-called dead-reckoning function, as shown in FIG. 8. The calculating device 32 is adapted to calculate the motion and the rotary angle of the vehicle, which carries it, on the basis of data from tire speed sensors 38. When a sunken condition occurs, and especially in the case of flowing water such as a river, the vehicle starts to move irregularly along the flow of the water, independent of the driver's operation and the movement of the tires and the position data measured by the GPS vary accordingly. The changes in the position data obtained by the dead-reckoning function become totally independent of the actual positional changes of the vehicle, and a controller 35 detects a disagreement between these data. In the case of the dead-reckoning function of a four-wheel vehicle adapted to estimate the position from the speed of each wheel, for example, the result of measurement will show no change at the time of sunken condition (a stopped condition) or a linear change according to the rotation of the driver wheels. It is because under a sunken condition the rotary speed of the follower wheels becomes nearly zero due to the water resistance while the rotary speed of the driver wheels will also become nearly zero if the engine is stopped but will continue to rotate similarly if the engine were still running. The movement of the vehicle due to the flow of water is not necessarily linear and the distance of travel is independent of the distance measured by the dead-reckoning function such as based on the rotation of the wheels. Thus, a sunken condition can be reliably detected from the disagreement between the position data, and the detected sunken condition may be communicated to an external system through the sunken condition transmitting device 8 described above with reference to FIG. 1.

Although the invention has been described above by way of only a limited number of examples, these examples are not intended to limit the scope of the invention. Many modifications and variations are possible within the scope of the invention. For example, the means for detecting a sunken condition according to this invention may be realized by controllers of many different kinds such as the controller of a power window system. It also goes without saying that two or more of the examples described above may be combined to form a detector.

What is claimed is:

1. A detector for sunken condition of a vehicle, said detector comprising:
   a sensor for measuring air pressure inside a tire; and
   a controller that is on said vehicle and monitors data on tire pressure measured by said sensor and identifies a sunken condition of said vehicle if the tire pressure measured by said sensor is temporarily reduced from a predetermined reference level by over a predetermined rate of change and thereafter is maintained at said predetermined reference level or increases.

2. The detector of claim 1 wherein said controller includes a sunken condition transmitting device for transmitting a signal indicative of the sunken condition judged to be present by said controller.

3. The detector of claim 1 wherein said sensor is inside a tire and is adapted to transmit a wireless signal on the measured air pressure inside said tire, said detector further comprising a reception antenna for receiving said wireless signal transmitted from said sensor and a reception circuit for demodulating said wireless signal received through said reception antenna, said controller monitoring said data based on said wireless signal demodulated by said reception circuit.

4. The detector of claim 2 wherein said sensor is inside a tire and is adapted to transmit a wireless signal on the measured air pressure inside said tire, said detector further comprising an reception antenna for receiving said wireless signal transmitted from said sensor and a reception circuit for demodulating said wireless signal received through said reception antenna, said controller monitoring said data based on said wireless signal demodulated by said reception circuit.

5. A detector for sunken condition of a vehicle, said detector comprising:
   a communication device that carries out wireless communications between a vehicle main body and a tire;
   a controller that is on said vehicle and monitors status of said wireless communications and judges that a sunken condition of said if said wireless communications remain impossible continuously over a specified length of time or a specified number of times;
   a steering torque sensor that measures steering torque, said controller monitoring data on steering torque measured by said steering torque sensor and identifying a sunken condition of said vehicle based on a drop in the measured steering torque;
   a sensor for measuring rotary speeds of driver and follower wheels of said vehicle, said controller monitoring data outputted from said sensor and identifying a sunken condition of said vehicle based on a relative drop of rotary speed of a follower wheel;
   a global positioning system; and
   a dead-reckoning device for sensing rotations of wheels of said vehicle and calculating motion and rotary angle of said vehicle based on said sensed rotations of said wheels, said controller monitoring position data of said vehicle obtained by said global positioning system and by said dead-reckoning device and identifying a sunken condition of said vehicle based on disagreement between said position data.

6. The detector of claim 5 wherein said controller includes a sunken condition transmitting device for transmitting a signal indicative of the sunken condition judged to be present by said controller.

7. The detector of claim 5 wherein said communication device includes a sensor inside a tire and adapted to transmit a wireless signal on the measured air pressure inside said tire, said detector further comprising an reception antenna for receiving said wireless signal transmitted from said sensor and a reception circuit for demodulating said wireless signal received through said reception antenna, said controller monitoring said data based on said wireless signal demodulated by said reception circuit.

8. The detector of claim 6 wherein said communication device includes a sensor inside a tire and adapted to transmit a wireless signal on the measured air pressure inside said tire, said detector further comprising an reception antenna for receiving said wireless signal transmitted from said sensor and a reception circuit for demodulating said wireless signal received through said reception antenna, said controller monitoring said data based on said wireless signal demodulated by said reception circuit.

9. The detector of claim 1 wherein said controller further serves to distinguish between a tire failure and said sunken condition, based on said measured tire pressure data.

10. The detector of claim 1 wherein said controller serves to identify a tire pressure if there is a pressure change that continues.

* * * * *